UNITED STATES PATENT OFFICE.

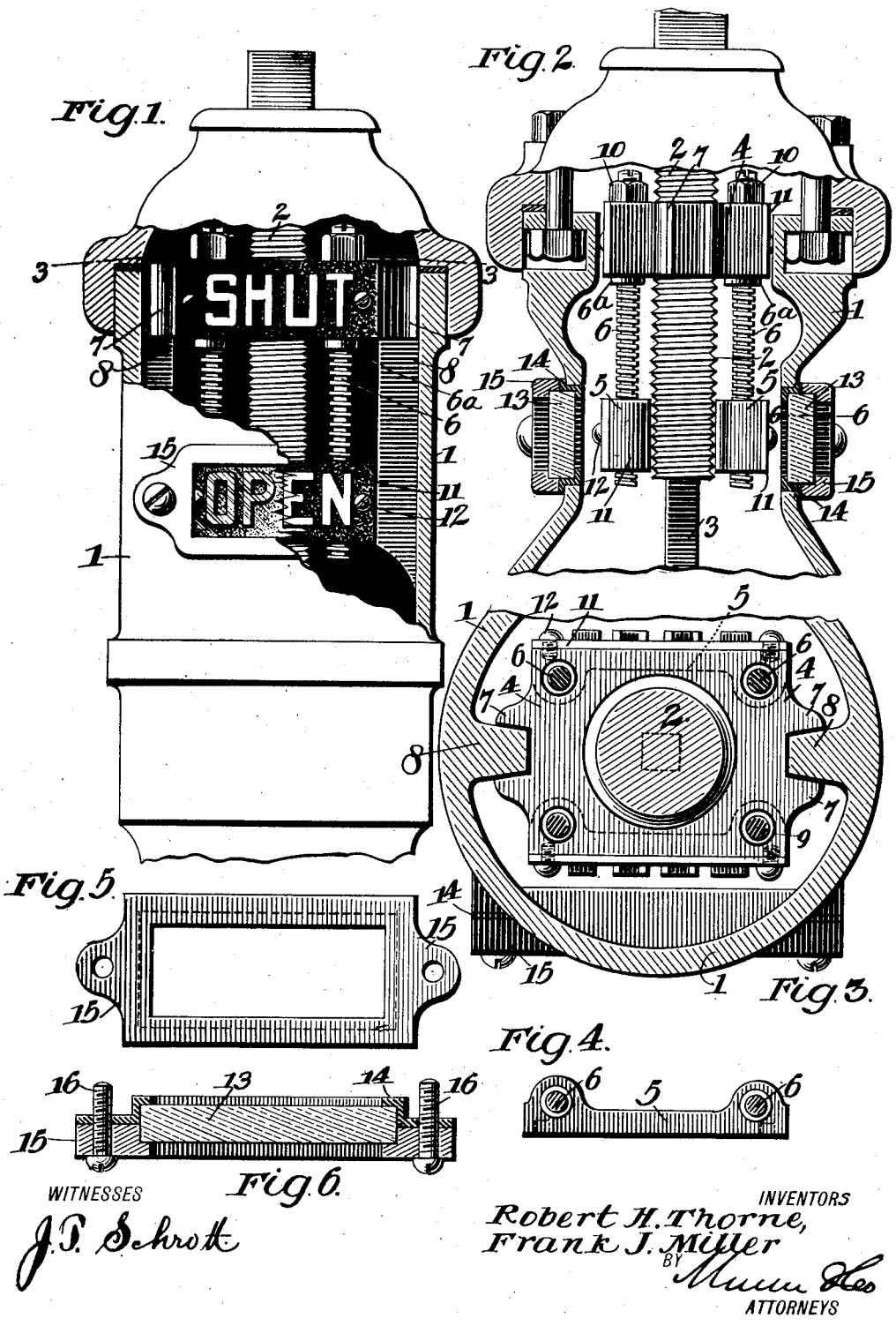
R. H. THORNE AND F. J. MILLER.
INDICATOR VALVE POST.
APPLICATION FILED AUG. 13, 1918.
1,338,263. Patented Apr. 27, 1920.
WITNESSES
J. P. Schrott
INVENTORS
Robert H. Thorne,
Frank J. Miller
BY
ATTORNEYS

ROBERT HARRY THORNE AND FRANK JAMES MILLER, OF WILLIAMSPORT, PENNSYLVANIA, ASSIGNORS TO DARLING VALVE AND MANUFACTURING COMPANY, OF WILLIAMSPORT, PENNSYLVANIA, A CORPORATION OF PENNSYLVANIA.

INDICATOR VALVE-POST.

1,338,263.     Specification of Letters Patent.     Patented Apr. 27, 1920.

Application filed August 13, 1918. Serial No. 249,723.

*To all whom it may concern:*

Be it known that we, ROBERT H. THORNE and FRANK J. MILLER, citizens of the United States, and residents of Williamsport, in the county of Lycoming and State of Pennsylvania, have invented certain new and useful Improvements in Indicator Valve-Posts, of which the following is a specification.

Our invention relates to improvements in indicator valve posts, and it consists in the constructions, combinations and arrangements herein described and claimed.

An object of our invention is to provide an improved indicator valve post embodying means whereby a relative adjustment of the legend bearing plates may be obtained.

Another object of the invention is to provide an indicator valve post wherein one legend bearing plate may be adjusted with respect to the other, so that but one valve operating screw of the same pitch need be employed irrespective of the diameter of the valve in any of a number of indicator posts wherein the invention may be embodied.

A further object of the invention is to provide an indicator valve post having the features above enumerated, and which is applicable to valves operating either by turning to the right or left, by simply reversing the legend bearing plates; this necessitates no change in the mechanism.

Other objects and advantages will appear in the following specification, reference being had to the accompanying drawing in which:

Figure 1 is a side elevation of a portion of an indicator valve post, portions being broken away to illustrate the mechanism on the inside, Fig. 2 is a detail cross section of the parts shown in Fig. 1, Fig. 3 is a horizontal section taken substantially on the line 3—3 of Fig. 1, Fig. 4 is a plan view of one of the lower carriages, Fig. 5 is an elevation of one of the window cover plates, and Fig. 6 is a cross section on the line 6—6 of Fig. 2.

In carrying out our invention we provide an arrangement of separate legend bearing carriages which are located on the inside of the casing 1 and arranged to move up and down with the valve operating screw 2 accordingly as the valve is operated. To this extent it must be understood that the screw 2 has a swivel mounting in the top and is provided with a non-circular bore into which the upper end of the spindle 3 projects. The spindle 3 carries a valve at the bottom, but since this part of the mechanism has no bearing on the invention, further description thereof is thought to be unnecessary.

The screw 2 carries an upper carriage 4 from which a pair of lower carriages 5 is pendently supported by means of the adjusting screws 6. The carriage 4 has guides 7 on the opposite end, and these move over ribs 8 which are cast on the inside of the post 1. The engagement of the guides 7 and ribs 8 prevents the turning of the carriage 4 and insures the correct vertical movement of the carriage when the screw 2 is turned.

Smooth holes 9 receive the upper threaded ends of the adjusting screws 6. Collars 6ª on the screws 6 bear on the bottom surface of the carriage 4 and nuts 10 bear on the top surface. The upper ends of the screws 6 are made with screw driver slots as illustrated, so that upon loosening the nuts 10, the screws 6 may be turned sufficiently to bring the lower carriages 5 into the proper relative positions with respect to the carriage 4, when the nuts 10 are again tightened to fix the adjustment.

Legend bearing plates 11 are fastened to the respective carriages by means of the screws 12. It is to be observed that these plates are separate. The one plate bears the legend "Shut" while the other bears the legend "Open." These legends are adapted to come into registration with the glass windows 13, and that one of the legends visible through the window on each side indicates whether the valve at the bottom is open or shut.

A frame 14 is set into the window aperture and the window glass 13 is in turn set in the frame. The glass is held in place by means of a cover plate 15 and the screws 16 which pass through ears on the cover plate and corresponding portions of the frame 14, into the body of the post 1 as clearly shown in Fig. 6.

It is desirable to know the particular advantage that the relatively adjustable legend bearing carriages has in the present invention. The actuating screw 2 and spindle 3 are parts common to indicator valve posts as they now appear on the market. The present practice is to form the blanks for the screw 2 and leave them unthreaded until it becomes known for what particular size of valve it is intended, when a thread of the required pitch is turned on the blank. The threads thus turned on the blanks vary with the different sizes of valves with which they are intended to be used; for instance, a 6" valve will require a thread of one pitch, a 10" valve will require a thread of another pitch, while a 12" valve will require a thread of still another pitch. These different pitches are necessary in order to secure the proper opening of the valve at the bottom when the screw 2 is turned through a certain number of revolutions.

It is also a fact that where the direction of turning of the threaded stem is reversed to open the valve, the threads on the blanks must be reversed making double the number of combinations.

This description applies to indicator valve posts of the present construction and it will readily be understood that the movement of the indicator carriage which usually bears legend plates whereon the two legends are fixed with respect to each other, will vary according to the difference in the pitch of the screw with the consequence that the legends will not register properly with the windows in the post. Should the legends register with the windows with one screw, when another is substituted, it will be found that the legends will not register.

The defects above enumerated are overcome by making one of the legend bearing carriages adjustable with respect to the other so that different sizes of valves which require corresponding different amounts of movement to open the stem, may be accommodated. The actuating screw 2 is formed in the first instance and it is not necessary to make a number of blanks to be kept in stock for threading as required. Should it be found that the legends "Open" on the lower legend bearing plates 11 do not come into proper registration with the windows 13, the nuts 10 at the top are simply unloosened, the adjusting screws 6 turned until the carriages 5 bring the legend bearing plates into proper registration with the windows, when the nuts 10 are again tightened and the proper relative adjustment of the lower carriages with respect to the upper carriage will have been made. This arrangement overcomes a serious inconvenience in a very simple manner. It is to be observed that the parts which comprise the actuating mechanism of the invention are few in number and simple in construction. Furthermore, it has been found in actual practice that the device is very effective for the purpose for which it is intended and, as stated before, absolutely overcomes the difficulties experienced with devices that at present are on the market. It has been indicated before that usually, the legend bearing plates have both legends formed thereon in fixed relationship. Thus it becomes impossible to adjust one with respect to the other in the manner herein outlined.

While the construction and arrangement of the device as herein described and illustrated is that of a generally preferred form, obviously modifications and changes may be made without departing from the spirit of the invention or the scope of the claims.

We claim:—

1. In an indicator valve post, screw-actuated legend plate bearing means, other legend plate bearing means, and combined means for suspending the latter from the former, arranged to adjust the latter with respect to the former.

2. In an indicator valve post, separate legend bearing plate supporting means, and means common to both arranged for adjusting one of said supporting means from the other.

3. An indicator valve post having a window, separate legend bearing plates movable into registration with said window, independent supporting means for said plates, and means carried by and arranged to be actuated from one of said supporting means for adjusting the other supporting means with respect thereto.

4. An indicator valve post having a window, separate legend bearing plates movable into registration with said window, independent supporting means for said plates, means carried by and arranged to be actuated from one of said supporting means for adjusting the other supporting means with respect thereto, and means for locking said adjusting means.

5. An indicator valve post having a window, an actuating screw, a legend plate bearing carriage movable on the actuating screw, guiding means for the carriage, a second legend plate bearing carriage independent of the actuating screw and first named carriage, and adjustable means for supporting the second carriage from the first to obtain the proper registration of the legend bearing plates of the second carriage with the window.

6. In an indicator valve post, a pair of windows in the post, a valve actuating screw, an upper carriage arranged to travel axially of the screw as the screw is turned, means mutually carried by said carriage and the indicator post for guiding the carriage and keeping it from turning, a pair of lower carriages mounted independently of the screw, a plurality of adjusting screws having a threaded engagement with the lower carriages and carried by the upper carriage, each screw having a collar engaging the upper surface of the lower carriage, a threaded upper portion provided with a screw driver slot, a jam nut on said upper threaded portion engaging the top surface of the upper carriage, and legend bearing plates secured to the respective carriages, and adapted to move into registration with said window.

7. An indicator valve post having a universally threaded actuating screw, and provided with a window, a valve carrying spindle operated by the actuating screw, a legend plate bearing carriage mounted on and axially movable as the actuating screw is turned, and a pair of legend plate bearing carriages adjustably and pendently supported from said carriage, and adapted to register with an adjacent window irrespectively of the size of the valve on the spindle and the number of turns of the actuating screw necessary to move the valve to its extreme position.

8. In an indicator valve post, an integral screw-actuated vertically guided member bearing a plurality of legend plates, separate legend plate bearing means corresponding in number to the plate formed by said integral member, and means carried by said integral member, for holding said separate members in suspension and enabling relative adjustments thereof by operation of said suspending means.

9. The structure of claim 8, further provided with means embodied in said suspending and adjusting means for locking the adjustment.

10. An indicator valve post having a window aperture, a glass plate, a frame set in the aperture, with a portion suitably formed to receive a portion of the glass; and a cover plate arranged to receive the remaining portion of the glass to form an edge binding, including a suitably formed portion bearing on the outside of the frame, and securing means; the arrangement enabling the whole structure to be bodily lifted out of said aperture.

11. Adjustable legend plate carrying means, operatively associated legend plate carrying means, and instrumentalities for supporting and adjusting the associated plate carrying means from the adjustable plate carrying means, including means for locking the supporting means after adjustment.

ROBERT HARRY THORNE.
FRANK JAMES MILLER.